US010410663B1

United States Patent
Macken et al.

(10) Patent No.: US 10,410,663 B1
(45) Date of Patent: Sep. 10, 2019

(54) SLIDER INCORPORATING A THERMOCOUPLE FOR DETECTING THERMAL ASPERITIES

(71) Applicant: Seagate Technology LLC, Cupertino, CA (US)

(72) Inventors: Declan Macken, Eden Prairie, MN (US); Kent Bodurtha, Richfield, MN (US); Sissay Yoseph, St. Paul, MN (US); Song Chen, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/812,486

(22) Filed: Nov. 14, 2017

Related U.S. Application Data

(60) Provisional application No. 62/425,255, filed on Nov. 22, 2016.

(51) Int. Cl.
*G11B 5/31* (2006.01)
*G11B 5/39* (2006.01)
*G11B 5/60* (2006.01)
*G11B 5/00* (2006.01)

(52) U.S. Cl.
CPC ............ *G11B 5/6076* (2013.01); *G11B 5/314* (2013.01); *G11B 5/3945* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,804,272 B1* | 8/2014 | Dakroub et al. | G11B 5/607 360/59 |
| 9,123,372 B2 | 9/2015 | Dakroub et al. | |
| 2008/0225426 A1* | 9/2008 | Roy et al. | G11B 5/314 360/31 |
| 2011/0277803 A1* | 11/2011 | Grande et al. | G01K 13/002 136/225 |
| 2011/0299367 A1* | 12/2011 | Naniwa et al. | G11B 5/607 369/13.33 |
| 2012/0120519 A1 | 5/2012 | Kunkel et al. | |
| 2014/0153130 A1* | 6/2014 | Garzon et al. | G11B 5/607 360/75 |
| 2015/0162038 A1 | 6/2015 | Macken et al. | |

* cited by examiner

*Primary Examiner* — Craig A. Renner
(74) *Attorney, Agent, or Firm* — Hollingsworth Davis, LLC (57) ABSTRACT

An apparatus comprises a slider configured for magnetic recording. The slider comprises an air bearing surface (ABS), a writer, a reader, and a plurality of electrical bond pads. A thermocouple is situated at the ABS proximate the reader and coupled to a pair of the electrical bond pads. The thermocouple is dimensioned to sense for a thermal asperity on a surface of a magnetic recording medium.

20 Claims, 6 Drawing Sheets

SLIDER INCORPORATING A THERMOCOUPLE FOR DETECTING THERMAL ASPERITIES

RELATED PATENT DOCUMENTS

This application claims the benefit of Provisional Patent Application No. 62/425,255 filed on Nov. 22, 2016, which is incorporated herein by reference in its entirety.

SUMMARY

Embodiments of the disclosure are directed to an apparatus comprising a slider configured for magnetic recording. The slider comprises an air bearing surface (ABS), a writer, a reader, and a plurality of electrical bond pads. A thermocouple is situated at the ABS proximate the reader and coupled to a pair of the electrical bond pads. The thermocouple is dimensioned to sense for a thermal asperity on a surface of a magnetic recording medium.

Other embodiments are directed to an apparatus comprising a slider configured for heat-assisted magnetic recording. The slider comprises an ABS, a writer, a near-field transducer, an optical waveguide, a reader, and a plurality of electrical bond pads. A thermocouple is situated at the ABS proximate the reader and coupled to a pair of the electrical bond pads. The thermocouple is dimensioned to sense for a thermal asperity on a surface of a magnetic recording medium.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to detecting thermal asperities arising from the surface of a magnetic recording medium. Thermal asperities are relatively small defects in a thin-film recording medium which protrude from the surface of the medium. Contact between a magnetic recording head and an asperity can render data stored near the asperity unrecoverable and cause damage to sensitive components of the recording head. Asperities are typically located and mapped during a drive certification process so that regions of the medium containing a thermal asperity can be avoided during operation of the drive in the field.

A conventional magnetic recording head can include a resistive sensor near the reader for detecting thermal asperities. The resistive sensor is biased with a relatively large current in order to raise the temperature of the resistive sensor well above the temperature of the adjacent magnetic recording medium. Contact between the resistive sensor and a thermal asperity is detected as a cooling event, resulting from sinking of heat from the hot resistive sensor to the cooler recording medium when the resistive sensor strikes the thermal asperity.

A diamond-like coating (DLC) is typically applied to the resistive sensor to protect the sensor from mechanical impact with thermal asperities and the surface of the recording medium. The DLC also serves to protect the resistive sensor from the corrosive environment at the air bearing surface of the slider. It has been found that the DLC covering the resistive sensor degrades at relatively high temperatures (e.g., between about 135° C. and 150° C.) and with repeated mechanical impact (e.g., contact with thermal asperities). This degradation of the DLC results in a breakdown of the DLC and exposing the resistive sensor to the corrosive environment at the ABS, leading to degradation and failure of the resistive sensor. With the DLC degraded or removed, the unprotected resistive sensor is subject to oxidation, which causes the resistive sensor to physically grow in size. This undesirable growth can become so extensive that the oxidized resistive sensor can contact the surface of the magnetic recording medium at normal fly heights.

Biasing the resistive sensor at a lower voltage can help to address heat-related DLC degradation, but results in unacceptably low sensitivity (reduced signal-to-noise ratio) due to the significantly reduced difference in temperature ($\Delta T$) between the resistive sensor and the thermal asperity. Operating a resistive sensor configured for thermal asperity detection at a low bias voltage is problematic, since reducing the applied voltage to achieve a reduced temperature necessarily results in a weaker sensor signal (dV).

Embodiments are directed to a slider of a magnetic recording device which incorporates a thermocouple dimensioned to sense for a thermal asperity on a surface of a magnetic recording medium. The thermocouple can be situated at an air bearing surface of the slider and located proximate a reader of the slider. In some embodiments, a thermocouple dimensioned to sense for thermal asperities can be implemented in sliders configured for perpendicular magnetic recording. In other embodiments, a thermocouple dimensioned to sense for thermal asperities can be implemented in sliders configured for heat-assisted magnetic recording, also referred to as energy-assisted magnetic recording (EAMR), thermally-assisted magnetic recording (TAMR), and thermally-assisted recording (TAR).

Figure 1:
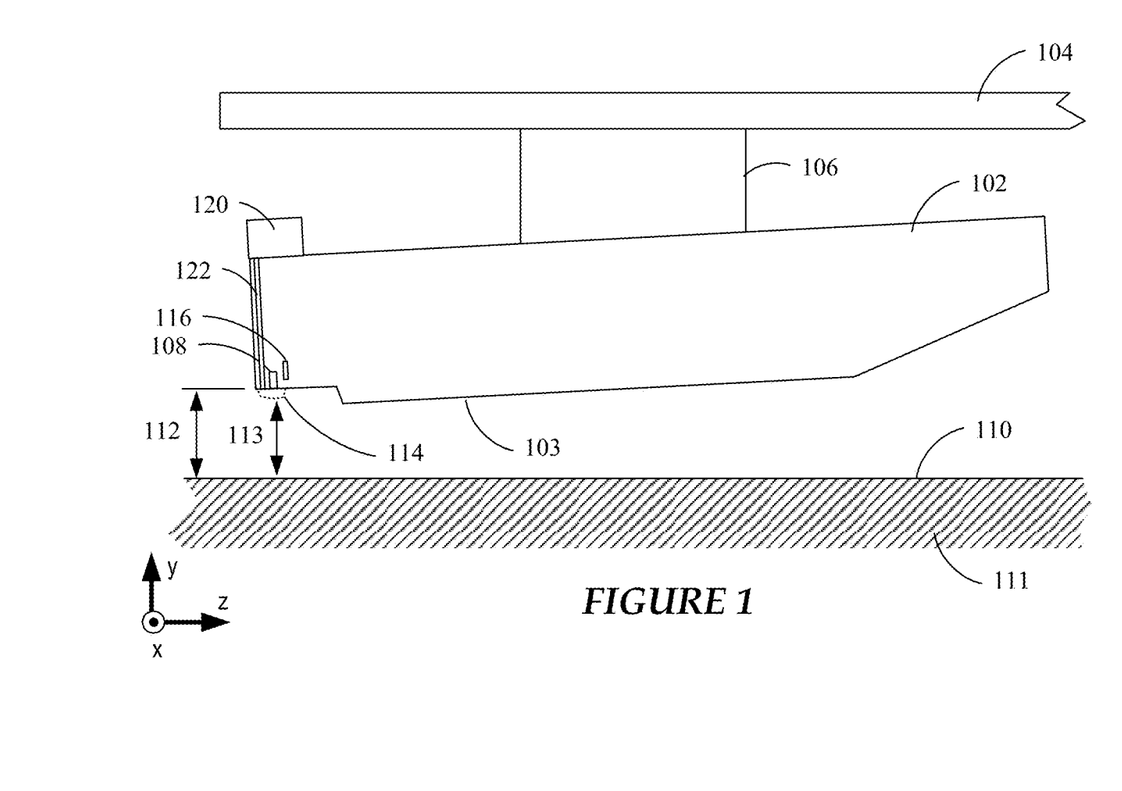
FIG. 1 is a schematic representation of a slider in which the various embodiments disclosed herein may be implemented.

Referring now to FIG. 1, a block diagram shows a side view of a recording head arrangement comprising a slider 102 according to a representative embodiment. The slider 102 may be used in a magnetic data storage device, e.g., a hard disk drive. The slider 102 may also be referred to herein as a recording head, a write head, or a read/write head. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. In some embodiments, the slider 102 is configured for perpendicular magnetic recording (PMR). In other embodiments, the slider 102 is configured as a HAMR recording head, in which case the slider 102 further includes an optical waveguide 122 coupled to a laser 120 (or other energy source) and a near-field transducer (see NFT 210 in FIG. 2). The waveguide 122 delivers light from the laser 120 to the NFT near the read/write transducers 108.

When the slider 102 is located over surface 110 of the recording medium 111, a flying height 112 is maintained between the slider 102 and the surface 110 by a downward force of arm 104. This downward force is counterbalanced by an air cushion that exists between the surface 110 and an air bearing surface (ABS) 103 (also referred to herein as a "media-facing surface") of the slider 102 when the recording medium 111 is rotating. It is desirable to maintain a predetermined slider flying height 112 over a range of disk rotational speeds during both reading and writing operations to ensure consistent performance. Region 114 is a "close point" of the slider 102, which is generally understood to be the closest spacing between the read/write transducers 108 and the magnetic recording medium 111, and generally defines the head-to-medium spacing 113.

To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. Typically, the ABS 103 of the slider 102 includes multiple close points depending of the operating mode of the recording head. For example, during write operations, a writer heater is activated and the writer defines the close point of the slider 102. During read operations, a reader heater is activated and the reader defines the close point of the slider 102.

Figure 2:
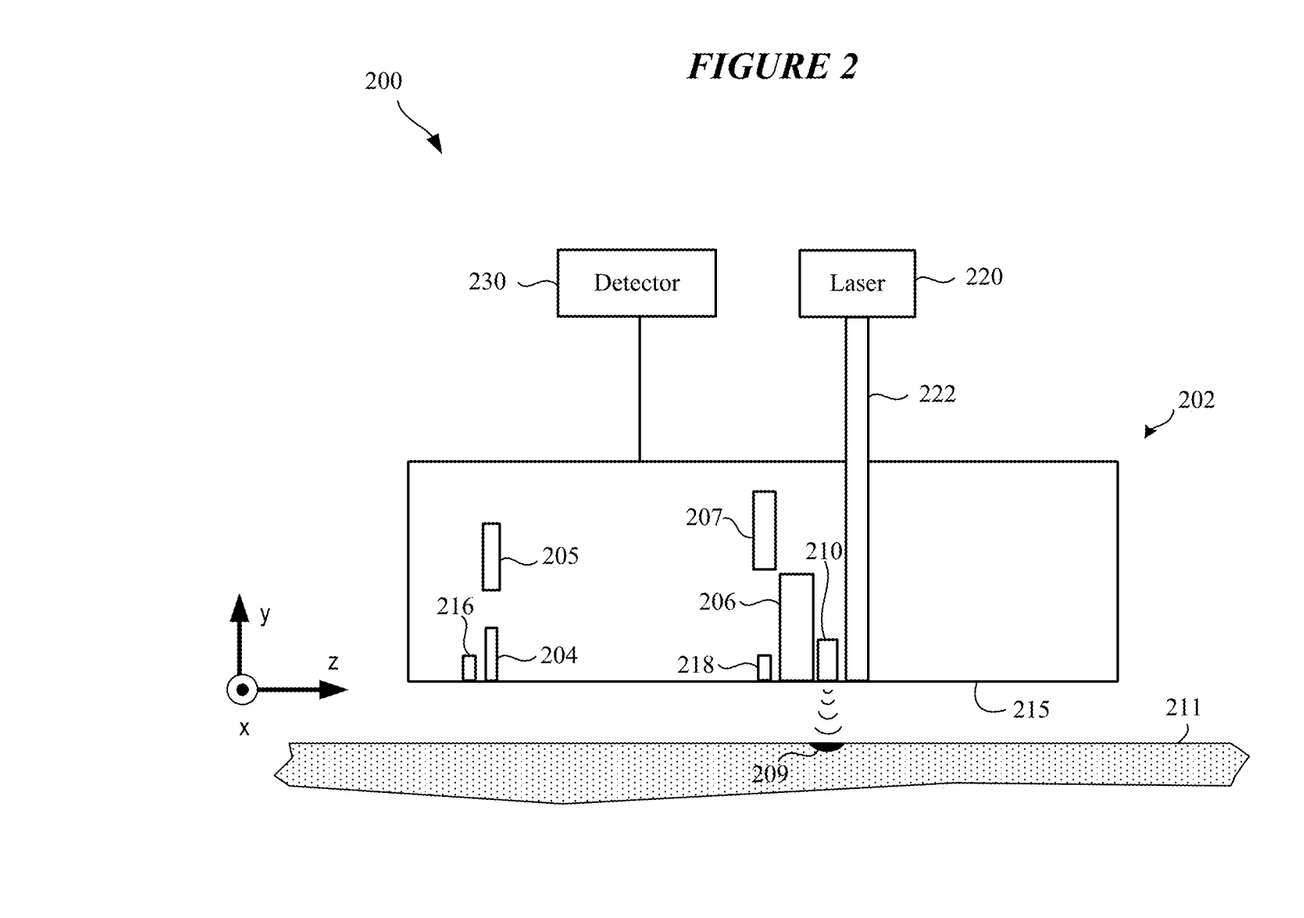
FIG. 2 shows a slider in which the various embodiments disclosed herein may be implemented.

FIG. 2 shows a recording head arrangement 200 configured for heat-assisted magnetic recording in accordance with various embodiments. The recording head arrangement 200 includes a slider 202 positioned proximate a rotating magnetic recording medium 211. The slider 202 includes a reader 204 and a writer 206 proximate the ABS 215 for respectively reading and writing data from/to the magnetic recording medium 211. The writer 206 is located adjacent an NFT 210 which is optically coupled to a light source 220 (e.g., laser diode) via a waveguide 222. The light source 220 can be mounted externally, or integral, to the slider 202. The light source 220 energizes the NFT 210 via the waveguide 222.

A HAMR device utilizes the types of optical devices described above to heat a magnetic recording media (e.g., hard disk) in order to overcome superparamagnetic effects that limit the areal data density of typical magnetic media. When writing with a HAMR device, electromagnetic energy is concentrated onto a small hot spot 209 over the track of the magnetic recording medium 211 where writing takes place. The light from the source 220 propagates to the NFT 210, e.g., either directly from the source 220 or through the mode converter or by way of a focusing element. Other optical elements, such as couplers, mirrors, prisms, etc., may also be formed integral to the slider. As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 209 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot 209 on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic recording medium 211. The NFT 210 achieves surface plasmon resonance in response to the incident electromagnetic energy. The plasmons generated by this resonance are emitted from the NFT 210 towards the magnetic recording medium 211 where they are absorbed to create the hot spot 209. At resonance, a high electric field surrounds the NFT 210 due to the collective oscillations of electrons at the metal surface (e.g., substrate) of the magnetic recording medium 211. At least a portion of the electric field surrounding the NFT 210 gets absorbed by the magnetic recording medium 211, thereby raising the temperature of the spot 209 on the medium 211 as data is being recorded.

As is shown in FIG. 2, the reader 204 is located at the ABS 215 and spaced away from the writer 206. A writer heater 207 is positioned near the writer 206, and a reader heater 205 is positioned near the reader 204. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211.

The slider 202 shown in FIG. 2 includes a thermocouple 216 positioned proximate the reader 204. The thermocouple 216 is dimensioned to sense for a thermal asperity on the surface of the magnetic recording medium 211. The thermocouple 216 is coupled to a detector 230 via a pair of electrical bond pads of the slider 202 (see, e.g., bond pads 503 in FIG. 5). Because the thermocouple 216 generates an intrinsic voltage signal in response to a temperature change, no biasing of the thermocouple 216 is needed. In other words, the thermocouple 216 need not be operated hot, like a resistive sensor would be. As such, the DLC covering the thermocouple 216 does not degrade due to excessive temperatures.

The detector 230 is configured to detect contact between the thermocouple 216 and a thermal asperity as a heating event. This heating event results from frictional heating of the thermocouple 216 due to mechanical contact with the thermal asperity. The thermocouple 216 produces an open circuit voltage that can be used by the detector 230 for detecting thermal asperities. The detector 230 can be configured to detect contact with a thermal asperity in response to receiving a sufficiently large voltage signal produced by the thermocouple 216 relative to a threshold.

The slider 202 also includes a resistive sensor 218 positioned proximate the writer 206. The resistive sensor 218 includes a sensing element comprising a material having a high temperature coefficient of resistance (TCR). The resistive sensor 218 is dimensioned to sense for contact between the slider 202 and the surface of the magnetic recording medium 211. Because the resistive sensor 218 is configured for head-medium contact detection, the resistive sensor 218 has a cross-track width at the ABS 215 that is significantly larger than that of the thermocouple 216 (e.g., larger by a factor of about 2 to 15). As such, the resistive sensor 218 is not dimensioned to sense for thermal asperities.

The resistive sensor 218 is generally biased with a relatively large voltage such that the resistive sensor 218 is hotter than the magnetic recording medium 211 (and the thermal asperities). The resistive sensor 218 is coupled to the detector 230. The detector 230 is configured to detect head-medium contact as a cooling event. The detector 230 can be configured to detect head-medium contact as a change in voltage across the resistive sensor 218 relative to a threshold.

Figure 3:
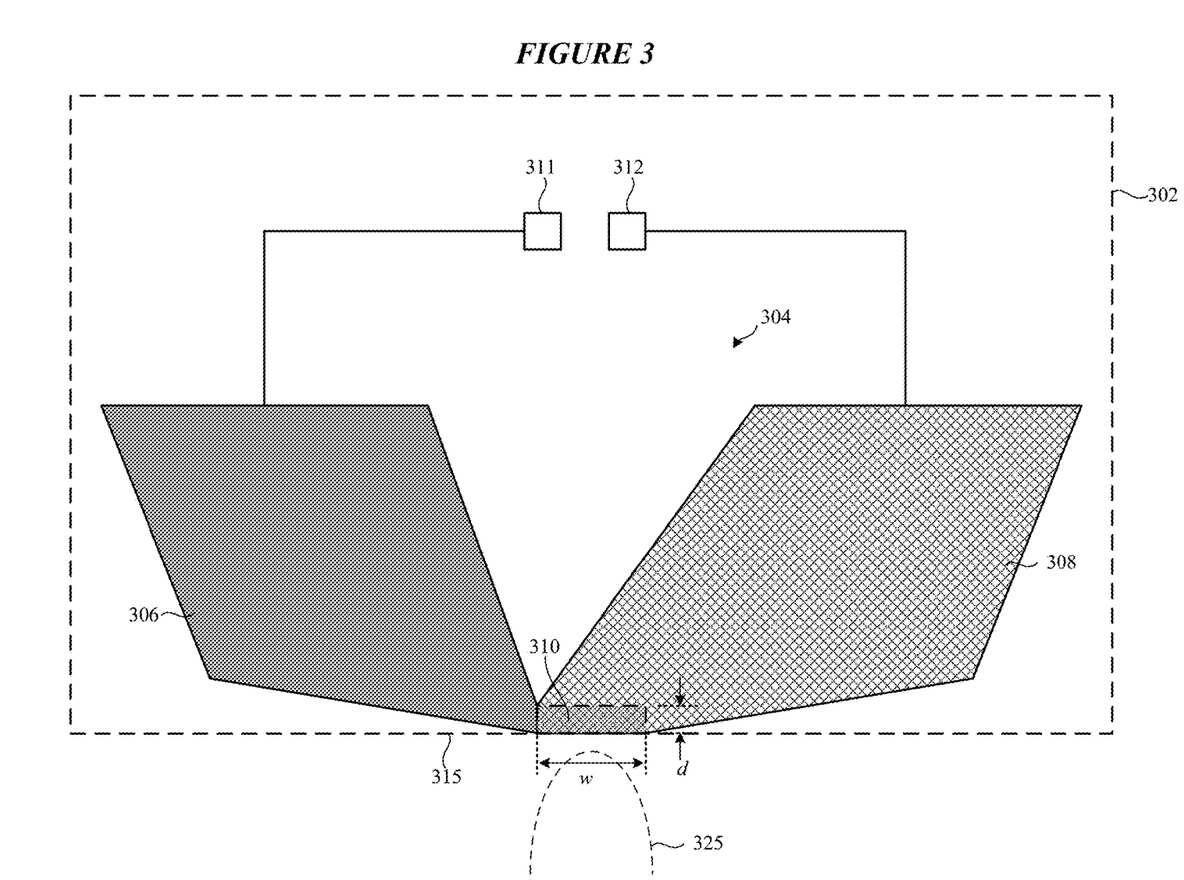
FIG. 3 shows a thermocouple configured for sensing thermal asperities in accordance with various embodiments.

FIG. 3 shows a thermocouple 304 configured for sensing thermal asperities in accordance with various embodiments. The thermocouple 304 can be incorporated in a PMR head or a HAMR head, such as those discussed previously with reference to FIGS. 1 and 2. The thermocouple 304 shown in FIG. 3 includes a first element 306 and a second element 308. In the embodiment shown in FIG. 3, the thermocouple 304 is positioned at the ABS 315. More particularly, the junction 310 formed between overlapping or contacting portions of the first and second elements 306 and 308 is positioned at the ABS 315.

Portions of the first and second elements 306 and 308 that form the junction 310 are substantially coplanar relative to the ABS 315. Portions of the first and second elements 306 and 308 adjacent the junction 310 are shown to recede from the ABS 315 and extend into the body of the slider 302. By exposing a limited portion of the thermocouple 304 (e.g., junction 310) to the ABS 315, the remaining portions of the thermocouple 304 are protected from the harsh environment at the ABS 315. It is noted that at least the junction 310 (and any other portion of the thermocouple 304) which is exposed at the ABS 315 is covered by a protective DLC. Because the thermocouple 314 is operated cool (no high biasing current), the DLC covering the thermocouple 304 does not degrade due to excessive temperatures.

The first and second elements 306 and 308 are dissimilar in terms of Seebeck coefficients and form the junction 310. In some embodiments, the dissimilar first and second elements 306 and 308 are metallic. In other embodiments, one of the first and second elements 306 and 308 can be formed from a conductive oxide, such as a transparent conductive oxide, and the other of the first and second elements 306 and 308 can be metallic. In further embodiments, the first and second elements 306 and 308 can be formed from a conductive oxide. A Seebeck coefficient for the junction 310 formed from these materials for purposes of detecting thermal asperities can range from about 900 µV/K to −900 µV/K.

Suitable metallic materials for the first and second elements 306 and 308 include Nichrome, Nickel Iron, Chromium, Tantalum, and Rhodium, among many others. Suitable conductive oxides for the first and/or second elements 306 and 308 include indium tin oxide (ITO), indium oxide, manganese-doped indium tin oxide, antimony tin oxide, ZnO, aluminum-doped zinc oxide (AZO), an aluminum and gallium co-doped ZnO ceramic (AGZO), Zn co-doped ITO, fluorine-doped tin oxide (FTO), reduced single crystal $TiO_2$, indium gallium zinc oxide (IGZO), $SnO_2$, $TiO_2$, $Ga_2O_3$, $CuAlO_2$, $Cu_2O$, $HfO_2$, MgO, $SiO_2$, $NiCo_2O_4$, $CuAlO_2$, $CuGaO_2$, $CuInO_2$, $SrCu_2O_2$, and LaCuOCh.

In the embodiment shown in FIG. 3, the thermocouple junction 310 is positioned at the ABS 315 of the slider 304. The junction 310 is dimensioned to facilitate reliable detection of relatively small thermal asperities 325, one of which is shown in an exaggerated manner in FIG. 3. A typical thermal asperity 325 has dimensions of about 0.75 µm in the cross-track direction. According to various embodiments, the junction 310 can have a cross-track width, w, of between about 500 nm and 1 µm and a depth, d, of about 50 nm and 150 nm. For example, the junction 310 can have a cross-track width, w, of about 750 nm and a depth, d, of about 100 nm.

In the embodiment shown in FIG. 3, the first element 306 of the thermocouple 304 is coupled to a first electrical bond pad 311 of the slider 302. The second element 308 of the thermocouple 304 is coupled to a second electrical bond pad 312 of the slider 302. The first and second bond pads 311 and 312 are coupled to a detector, such as that shown in FIGS. 2 and 5. An open circuit voltage generated by the thermocouple 304 can be measured as the potential between bond pads 311 and 312. The open circuit voltage produced by the thermocouple 304 can be used by the detector for detecting thermal asperities.

Figure 4:
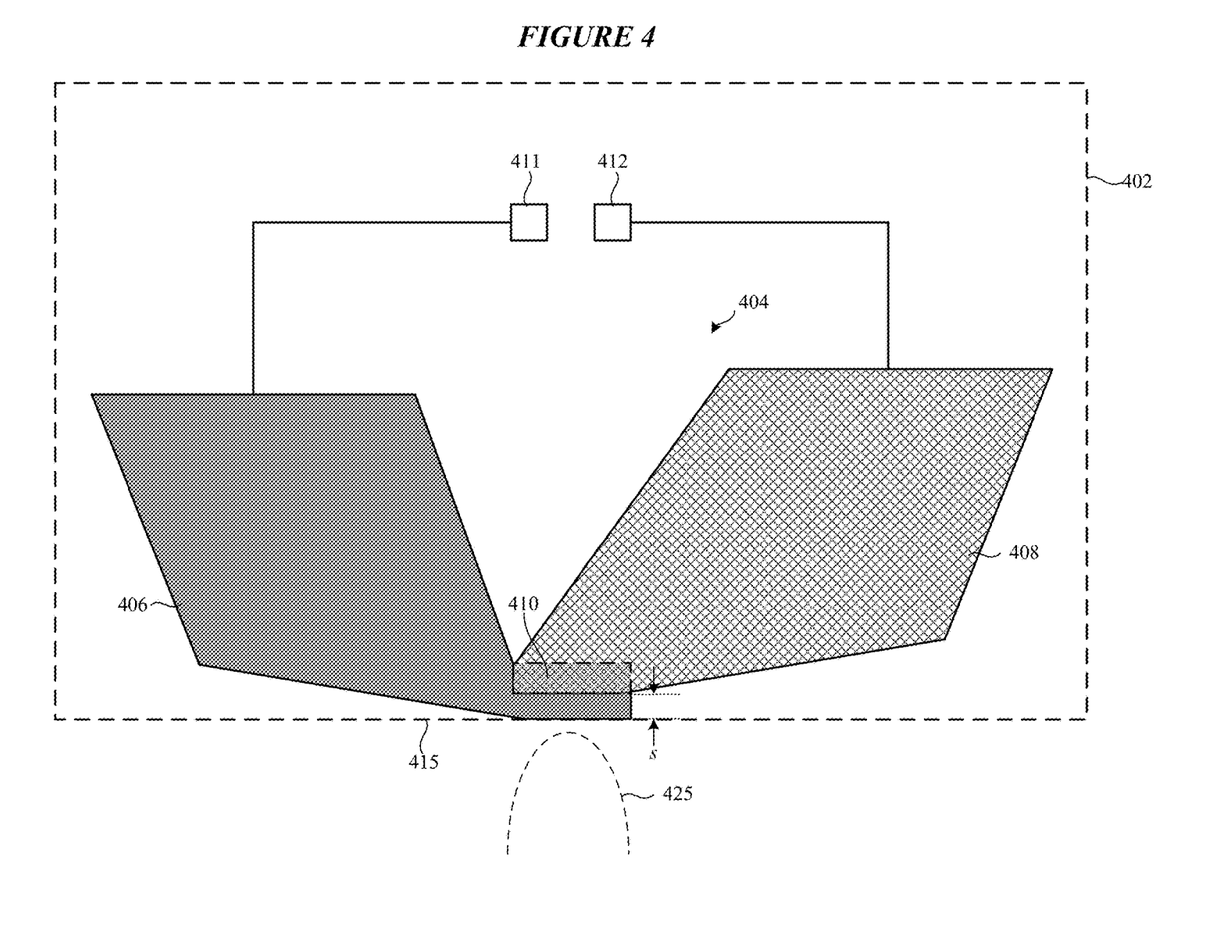
FIG. 4 shows a thermocouple configured for sensing thermal asperities in accordance with other embodiments.

FIG. 4 shows a thermocouple 404 configured for sensing thermal asperities 425 in accordance with various embodiments. The thermocouple 404 can be incorporated in a PMR head or a HAMR head, such as those discussed previously with reference to FIGS. 1 and 2. The thermocouple 404 shown in FIG. 4 includes a first element 406 and a second element 408 which are dissimilar in terms of Seebeck coefficients and form a junction 410. In some embodiments, the dissimilar first and second elements 406 and 408 are metallic (see, e.g., the metals/alloys listed above). In other embodiments, one of the first and second elements 406 and 408 can be formed from a conductive oxide (see, e.g., the list of conductive oxides listed above), and the other of the first and second elements 406 and 408 can be metallic. In further embodiments, the first and second elements 406 and 408 can be formed from a conductive oxide. In the embodiment shown in FIG. 4, the first element 406 of the thermocouple 404 is coupled to a first electrical bond pad 411 of the slider 402. The second element 408 of the thermocouple 404 is coupled to a second electrical bond pad 412 of the slider 402.

The thermocouple 404 shown in FIG. 4 is generally positioned at the ABS 415. However, in the embodiment shown in FIG. 4, the junction 410 formed between overlapping or contacting portions of the first and second elements 406 and 408 is positioned away from the ABS 415. In this embodiment, the junction 410 is recessed into the body of the slider 402 and spaced from the ABS 415. More particularly, a portion of the first element 406 that forms the junction 410 is substantially coplanar relative to the ABS 415. A portion of the second element 408 that forms the junction 410 is recessed into the slider body by a distance, s. As such, the overlapping or contacting portions of the first and second elements 406 and 408 that form the junction 410 are spaced from the ABS by the distance, s. The distance, s, can be about 10 nm to 100 nm, for example.

Recessing the thermocouple junction 410 can serve to protect the junction 410 from the harsh environment at the ABS 415. Positioning the first element 406 at the ABS 415 provides for good thermal conduction between the ABS 415 and the junction 410. As such, a thermocouple 404 with a recessed junction 410 provides for good thermal asperity detection performance while providing effective protection of the junction 410 during device certification and operation in the field. It is noted that the portion of the first element 406 exposed at the ABS 415 is typically covered with a protective DLC. A DLC is not needed for the second element 408, as this element is situated entirely within the body of the slider 402 according to various embodiments.

Figure 5:
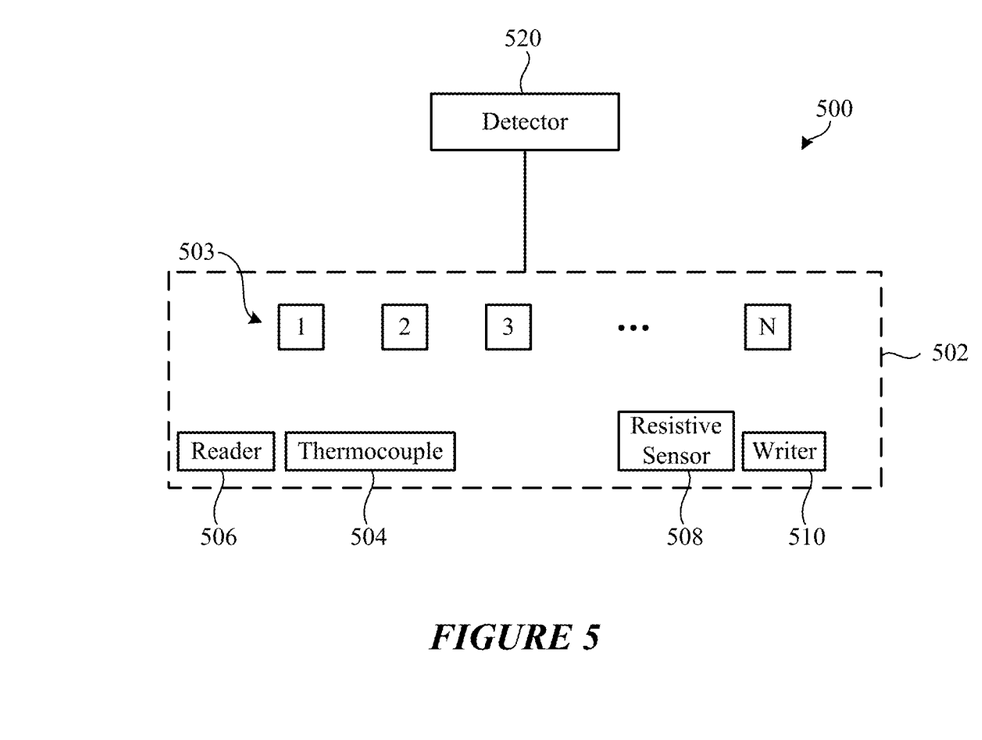
FIG. 5 illustrates a slider arrangement that incorporates a thermocouple dimensioned to sense for thermal asperities in accordance with various embodiments.

FIG. 5 illustrates a slider arrangement 500 that incorporates a thermocouple dimensioned to sense for thermal asperities in accordance with various embodiments. The slider arrangement 500 shown in FIG. 5 includes a slider 502 coupled to a detector 520. The slider includes a writer 510 and a resistive sensor 508 positioned proximate the writer 510. The resistive sensor 508 is configured to sense for contact between the slider 502 and an adjacent magnetic recording medium. More particularly, the resistive sensor 508 is configured to sense for head-medium contact when the writer region of the slider 502 is the close point of the slider 502, such as when writing to the magnetic recording medium with the writer heater activated.

The slider 502 also includes a reader 506 spaced apart from the writer 510. A thermocouple 504 of a type previously described is positioned proximate the reader 506. The thermocouple 504 is configured to sense for contact between the slider 502 and thermal asperities of the magnetic recording medium. More particularly, the thermocouple 504 is configured to sense for thermal asperities when the reader region of the slider 502 is the close point of the slider 502, such as when mapping thermal asperities during device certification with the reader heater activated.

In response to contacting a thermal asperity, the thermocouple 504 generates a voltage due to frictional heating resulting from the contact event. The open circuit voltage produced by the thermocouple 504 can be used by the detector 520 for detecting thermal asperities. For example, a threshold voltage indicative of contact between the slider 502 and a thermal asperity in the reader region can be determined through modeling or empirically through experimentation. The detector 520 can be configured to compare the open circuit voltage across a pair of bond pads 503 connected to the thermocouple 504 with the threshold voltage. If the open circuit voltage produced by the thermocouple 504 exceeds the threshold voltage, the detector 520 can generate a signal indicating contact between the slider 502 and a thermal asperity has occurred.

The slider 502 includes a number of electrical bond pads 503 to which various components of the slider 502 are coupled. An issue with adding additional components (e.g., thermocouple 504) or any electrical feature in general to an existing slider or head gimbal assembly (HGA) is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is for the thermocouple 504 to share an existing bond pad with at least one other electrical device on the slider.

Various embodiments of the disclosure are directed to a slider that incorporates a set of bond pads 503 coupled to bias sources and a multiplicity of electrical components coupled to the bond pad set, wherein at least one of the bond pads is shared between at least one of the electrical components and the thermocouple 504. Since additional bond pads add cost and complexity to HGA, it is desirable to provide both sensing of head-medium contact and thermal asperity detection without the need for additional bond pads.

Figure 6:
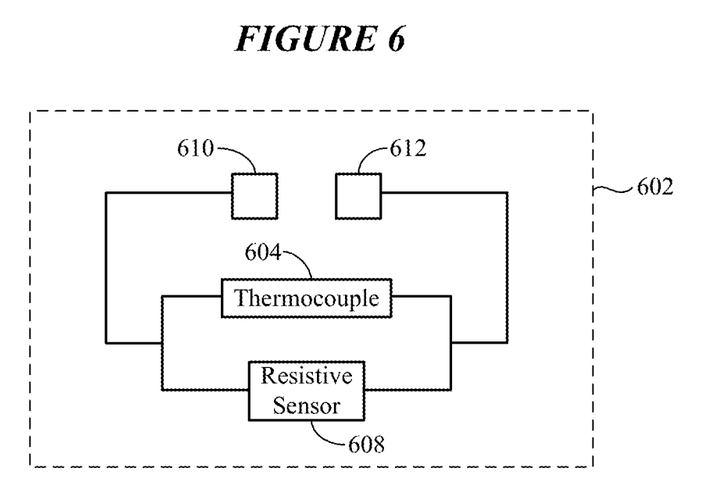
FIG. 6 shows bond pad sharing between a thermocouple and a resistive sensor of a slider in accordance with various embodiments.

FIG. 6 illustrates a slider 602 which employs bond pad sharing between a thermocouple 604 and a resistive sensor 608 in accordance with various embodiments. The thermocouple 604 is typically situated at the reader region of the slider 602, and the resistive sensor 608 is typically situated at the writer region of the slider 602. In the embodiment shown in FIG. 6, the thermocouple 604 and the resistive sensor 608 are coupled in parallel to electrical bond pads 610 and 612.

Given the bond pad sharing configuration shown in FIG. 6, the thermocouple 604 and the resistive sensor 608 are powered up (active) and powered down (inactive) in tandem. However, the thermocouple 604 can be operated for sensing purposes during read/thermal asperity detection operations and inactive for sensing purposes during write operations. Conversely, the resistive sensor 608 can be active for sensing purposes during write operations and inactive for sensing purposes during read/thermal asperity detection operations. Because the thermocouple 604 and the resistive sensor 608 can be operated alternately for sensing purposes, these two devices can be operated effectively using the bond pad sharing configuration shown in FIG. 6.

During thermal asperity detection operations, for example, a bias current/voltage need not be applied at bond pads 610 and 612, and an open circuit voltage, V, of the thermocouple 604 can be measured as the potential between bond pads 610 and 612 for sensing thermal asperities. During write/clearance setting operations and slider fly height measurements, a bias current/voltage can be applied to the bond pads 610 and 612, and changes in the voltage potential across the bond pads 610 and 612 can be measured to detect head-medium contact events or measure changes in slider fly height.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
    a slider configured for magnetic recording, the slider comprising an air bearing surface (ABS), a writer, a reader, and a plurality of electrical bond pads; and
    a thermocouple situated at the ABS proximate the reader and coupled to a pair of the electrical bond pads, the thermocouple dimensioned to sense for a thermal asperity on a surface of a magnetic recording medium and comprising:
        a junction formed between a first element and a second element, the first and second elements having different Seebeck coefficients;
        wherein portions of the first and second elements that form the junction are substantially parallel relative to one another and the ABS.

2. The apparatus of claim 1, wherein the junction has a cross-track width between about 500 nm and 1 µm and a depth between about 50 nm and 150 nm.

3. The apparatus of claim 1, wherein the junction has a cross-track width of about 750 nm and a depth of about 100 nm.

4. The apparatus of claim 1, wherein the first and second elements comprise a metal having different Seebeck coefficients.

5. The apparatus of claim 1, wherein the first element comprises a metal and the second element comprises an optically transparent material, the first and second elements having different Seebeck coefficients.

6. The apparatus of claim 1, wherein:
the portions of the first and second elements that form the junction are positioned at the ABS.

7. The apparatus of claim 1, wherein:
the portion of the first element that forms the junction is positioned at the ABS; and
the portion of the second element that forms the junction is recessed into the slider and spaced from the ABS relative to the first element portion.

8. The apparatus of claim 1, further comprising a resistive sensor situated at the ABS proximate the writer, wherein:
the thermocouple is coupled to the resistive sensor; and
the thermocouple and the resistive sensor are coupled to the pair of electrical bond pads.

9. The apparatus of claim 8, wherein the thermocouple and the resistive sensor are coupled in parallel to the pair of electrical bond pads.

10. The apparatus of claim 1, further comprising a detector coupled to the pair of electrical bond pads, the detector configured to detect contact between the thermocouple and the thermal asperity in response to a signal generated by the thermocouple.

11. An apparatus, comprising:
a slider configured for heat-assisted magnetic recording, the slider comprising an air bearing surface (ABS), a writer, a near-field transducer, an optical waveguide, a reader, and a plurality of electrical bond pads; and
a thermocouple situated at the ABS proximate the reader and coupled to a pair of the electrical bond pads, the thermocouple dimensioned to sense for a thermal asperity on a surface of a magnetic recording medium and comprising:
a junction formed between a first element and a second element, the first and second elements having different Seebeck coefficients;
wherein portions of the first and second elements that form the junction are substantially relative to one another and the ABS.

12. The apparatus of claim 11, wherein the junction has a cross-track width between about 500 nm and 1 μm and a depth between about 50 nm and 150 nm.

13. The apparatus of claim 11, wherein the junction has a cross-track width of about 750 nm and a depth of about 100 nm.

14. The apparatus of claim 11, wherein the first and second elements comprise a metal having different Seebeck coefficients.

15. The apparatus of claim 11, wherein the first element comprises a metal and the second element comprises an optically transparent material, the first and second elements having different Seebeck coefficients.

16. The apparatus of claim 11, wherein:
the portions of the first and second elements that form the junction are positioned at the ABS.

17. The apparatus of claim 11, wherein:
the portion of the first element that forms the junction is positioned at the ABS; and
the portion of the second element that forms the junction is recessed into the slider and spaced from the ABS relative to the first element portion.

18. The apparatus of claim 11, further comprising a resistive sensor situated at the ABS proximate the writer, wherein:
the thermocouple is coupled to the resistive sensor; and
the thermocouple and the resistive sensor are coupled to the pair of electrical bond pads.

19. The apparatus of claim 18, wherein the thermocouple and the resistive sensor are coupled in parallel to the pair of electrical bond pads.

20. The apparatus of claim 11, further comprising a detector coupled to the pair of electrical bond pads, the detector configured to detect contact between the thermocouple and the thermal asperity in response to a signal generated by the thermocouple.

* * * * *